United States Patent [19]

Edwards et al.

[11] Patent Number: 4,693,800
[45] Date of Patent: Sep. 15, 1987

[54] PROPERTY VARIATION OF DISPERSION RESINS BY ELECTROFILTRATION

[75] Inventors: Walter A. Edwards, North Ridgeville; George R. Huddleston, Jr., Lorain, both of Ohio

[73] Assignee: The B. F. Goodrich Company, New York, N.Y.

[21] Appl. No.: 802,930

[22] Filed: Nov. 29, 1985

[51] Int. Cl.$^4$ .............................................. B01D 13/02
[52] U.S. Cl. ................................ 204/180.1; 204/180.2; 204/180.9; 204/182.3; 204/299 R; 204/300 R; 204/301; 528/482; 528/485; 528/486; 528/488; 528/499; 528/500; 528/501; 528/502
[58] Field of Search ............... 204/182.3, 180.9, 180.1, 204/180.2, 301, 299 R, 300 R; 210/748; 524/423, 327; 525/329.1; 528/482, 485, 486, 488, 499, 500, 501, 502; 526/212

[56] References Cited

U.S. PATENT DOCUMENTS

| 3,664,940 | 5/1972 | Greyson et al. | 204/182.3 |
| 3,901,842 | 8/1975 | Dembrowski | 260/29.6 |
| 4,107,026 | 8/1978 | Freeman, II | 204/180.1 |
| 4,134,820 | 1/1979 | Ellis et al. | 204/300 |
| 4,170,529 | 10/1979 | Freeman | 204/182.3 |
| 4,207,158 | 6/1980 | Freeman | 204/180 |
| 4,246,039 | 1/1981 | Mixon, Jr. | 106/288 |
| 4,292,424 | 9/1981 | Huddleston | 528/500 |
| 4,331,525 | 5/1982 | Huba et al. | 204/180.1 |
| 4,549,947 | 10/1985 | Inoue et al. | 204/301 |
| 4,561,953 | 12/1985 | Muralidhara et al. | 204/182.3 |
| 4,569,739 | 2/1986 | Klinkowski | 204/180.1 |

FOREIGN PATENT DOCUMENTS 0028837 10/1980 European Pat. Off.

Primary Examiner—Arthur P. Demers

[57] ABSTRACT

The surface characteristics of dispersed particles such as vinyl resins are changed through the use of an anode electrolyte in an electrofilter. Accordingly, the properties of intermediate and final products made from these resins such as plastisols and fused films or coatings can be favorably changed. Properties which are altered include plastisol viscosity, film clarity, and foamability.

23 Claims, 1 Drawing Figure

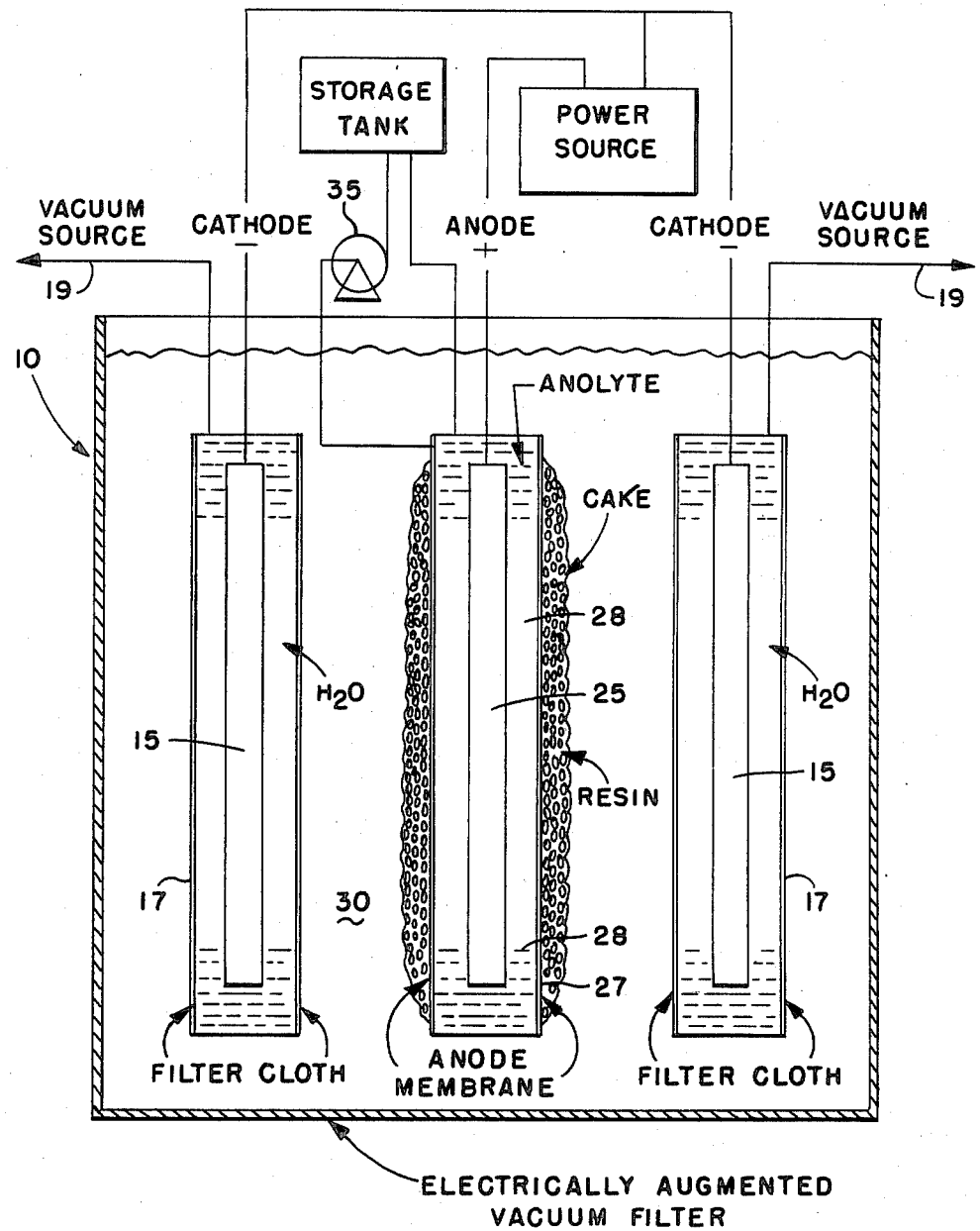

PROPERTY VARIATION OF DISPERSION RESINS BY ELECTROFILTRATION

FIELD OF THE INVENTION

The present invention relates to imparting new properties to dispersed particles by altering the surface characteristics of said particles.

BACKGROUND

Heretofore, in the field of polymerization of dispersion resins, once a surface active agent, for example an emulsifier, was added to the resin in a polymerization process to provide a desired particle size or a stable dispersion, it was retained by the resin throughout its manufacturing life including end product use. Oftentimes, such agents imparted unfavorable properties. By way of example, in the emulsion polymerization of vinyl resins, relatively large quantities of emulsifiers, soaps, etc. are utilized. Although in emulsion polymerization, the finished product is a polymer latex which theoretically ca be coagulated, filtered to remove the polymer particles, washed to remove part of the surfactant and then dried, practically it is difficult to conduct such a process without using coagulation aids of various types which aids may impart unfavorable properties to the end products. Thus, in the common industry practice of spray drying the polymer latex, various emulsifiers, surfactants, etc., are deposited on the polymer particles surface, thus generally imparting unfavorable properties thereto. These deposits can and often do impart cloudiness or turbidity in films when the film is made from a plastisol. The surfactant type will strongly influence the viscosity of a plastisol made from the resin and often produce a value other than desired. Heat stability and color of the plastisols are also affected.

While numerous attempts have been made to remove the emulsifiers, etc., from various dispersed particles as by simply washing the same, most have encountered various technical problems. Moreover, the various proposals have been expensive and complicated. Accordingly, little has been done to remove the soap after the spray-drying operation.

Although various compounds have been added to a spray-drying solution to alter the surface characteristics of the dispersion resins, such processes require a large amount of such compounds in order to overcome the effects of the surfactant which were already present. Oftentime, it is not possible to eliminate the effect of the original surfactant.

U.S. Pat. No. 3,901,842 relates to coagulation of a vinyl polymer latex, centrifuging the same to form a polymer wetcake and then redispersing the wetcake by use of a redispersant such as a polyacrylate. Thereafter the redispersed wetcake is dried in a spray-dryer.

U.S. Pat. No. 4,292,424 to Huddleston et al relates to the production of vinyl dispersion resins by means of emulsion polymerization and the recovery of the resins by a process which includes coagulating the latex to form a filtering sludge, passing the sludge to a pressure filter to separate the high solids, forming a friable wetcake, rinsing the wetcake with proper agents to neutralize the same and removing undesirable residues. Pressure in the filter is applied to the rinsed wetcake to increase the solids content thereof. The wetcake is then broken into particles, dried and ground to a proper size in one step in a fluid energy mill.

U.S. Pat. No. 4,207,158 relates to a process for dewatering a suspension of solids utilizing an electrically augmented vacuum filtration apparatus.

U.S. Pat. No. 4,331,525 relates to a process and apparatus for the recovery of suspended solids from a liquid medium. The liquid medium containing suspended solids is circulated through an electrolytic cell and an ultrafiltration unit, the suspended solids being removed from the liquid medium as a uniform particulate mass of low liquid content while a proportionate amount of the liquid and dissolved components such as surfactants is removed through ultrafiltration to avoid a dilution of the liquid medium.

European Patent Application No. 0,028,837 relates to a processing apparatus for recovering suspended solids from a liquid medium. An electrolytic cell as well as an ultrafiltration unit is utilized.

U.S. Pat. No. 4,134,820 relates to an apparatus for removing a wetcake from an anode in an electrofiltration process.

U.S. Pat. No. 4,107,026 relates to a method and apparatus for dewatering suspended matter and includes the use of vacuum filtration.

U.S. Pat. No. 4,246,039 is similar to U.S. Pat. No. 4,107,026 and also relates to the use of electrofilitration.

SUMMARY OF THE INVENTION

Dispersed particles are produced having changed surface characteristics by use of the anode electrolyte in an electrofilter. In other words, the surface characteristics of various dispersed particles are generally controlled to give desired and often improved end product properties. Surface characteristics are changed by chemical reactions taking place during an ion exchange process which is an integral part of electrofiltration. Moreover, whole molecules are added to the particle surface.

In general, a dispersed particle having replaceable ions thereon forming a specific ion environment, comprises, an electrofilter, said electrofilter containing the dispersed particle therein, said electrofilter having an anode cell, said anode cell having an anolyte compound therein, said anode cell upon the application of a current thereto altering the surface environment of said dispersed particle by at least partially replacing ions from said anolyte compound for the particle replaceable ion.

A process for changing the surface characteristics of a dispersed particle in an electrically augmented vacuum filter having an anode cell and containing a dispersed particle slurry therein, comprises the steps of utilizing in the anode cell an electrolyte solution having ions therein, collecting the dispersed particle on said anode cell, said dispersed particle having ions thereon, and exchanging at least some of said dispersed particle ions for said electrolyte ions.

A particle prepared by a dispersible polymerization comprises the dispersed particle, said dispersed particle having at least an ion thereon other than the dispersed preparation ion.

BRIEF DESCRIPTION OF THE DRAWING

The drawing is a schematic diagram of an electrically augmented vacuum filter.

DETAILED DESCRIPTION

The present invention generally relates to changing the surface characteristics of dispersed particles, that is particles which are suspended in an aqueous solution or in a solvent and can contain a charge thereon. The conductivity of the solution containing the charged particles is from about 200 to about 5,000 micromhos/cm and more desirably from about 500 to about 2,000 micromhos/cm. Various polymers which can be prepared by dispersion methods include various types of rubber as made through emulsion polymerization, e.g., styrene-butadiene rubbers, polybutadiene, polyisoprene, polystyrene butadiene-acrylonitrile rubbers, neoprene, or other types of polymers such as polyvinyl chloride; copolymers of vinyl chloride with vinyl acetate, vinylidene chloride, ethyl acrylate, etc.; fluorocarbon polymers; styrene-methyl methacrylate; polyethylacrylate; and the like.

Additionally, various polymers can be utilized which generally do not inherently contain a charge. These optionally can have a charge added thereto as through the use of a surfactant, for example, a soap, and the like. The preparation and existence of such dispersed particles are well known to the art and to the literature. A preferred type of dispersed particles is the vinyl resins. That is, polymers or copolymers of vinyl and vinylidene halides, such as vinyl chloride, vinylidene chloride, and the like. The vinyl halides and vinylidene halides can be copolymerized with each other or copolymerized with one or more unsaturated polymerizable olefinic monomers. Examples of such unsaturated olefinic monomers include alpha-beta-olefinically unsaturated carboxylic acids, such as acrylic acid, methacrylic acid, ethacrylic acid, alpha-cyanoacrylic acid, and the like; esters of acrylic acid, such as methyl acrylate, ethylacrylate, butyl acrylates, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl esters, such as ethylvinyl ether, chloroethyl vinyl ether, and the like; the vinyl ketones; styrene and styrene derivatives including vinyl toluene, chlorostyrene, and the like; vinyl naphthalene, allyl and vinyl chloroacetate, vinyl acetate, vinyl pyridine, methyl vinyl ketone, and other polymerizable olefinic monomers of the types known to those skilled in the art and to the literature.

The vinyl dispersed resins are made by emulsion polymerization of vinyl chloride or vinylidene chloride, either alone or in admixture with one or more olefinic monomers copolymerizable therewith in amounts up to about 30% by weight of vinyl monomer based on the total weight of the monomer mixture. The most preferred type of vinyl dispersed resin is polyvinyl chloride (PVC). As known to the art and to the literature, the preparation of various vinyl dispersed resins via emulsion polymerization techniques are known. Thus the various conventional free radical yielding catalysts or initiators can be utilized, as well as various conventional emulsifiers or emulsifying systems, the optional use of long straight chain saturated alcohols containing from 8 to about 24 carbon atoms, suitable temperature and pH ranges, and the like, all are set forth in U.S. Pat. No. 4,292,424, which is hereby fully incorporated by reference with regard to the same.

Regardless of the type of dispersion resin, an electrofilter is utilized to change the surface characteristics of such resins. More specifically, the electrofilter is desirably an electrically augmented vacuum filter (EAVF) used to generate a relatively dry wetcake of the dispersed particles, as for example containing from about 70% to about 90% total solids by weight although, of course, higher or lower solid amounts can be prepared. Referring to the drawing, the EAVF, generally indicated by the numeral 10, contains cathode electrodes 15 which are surrounded by a framework or lattice generally made of plastic or other suitable material. A filter cloth 17 resides upon the lattice and is sealed thereby forming a cathode cell. A vacuum line 19 is connected to the cathode cell to create a vacuum filter. Upon the application of a vacuum to the cathode cell, water as well as water soluble components such as surfactants, emulsifiers, soaps, salts, and the like are filtered out through filter cloth 17. Filter cloth 17 can be made of any conventional filter cloth such as cotton, polyester or polypropylene, and have an appropriate pore size to transmit water therethrough but retain any dispersed particles. Since the dispersed particles would plug the pores of the filter cloth, the system is electrified to abate such a problem. Thus cathode 15 is connected to a power source.

As shown in the drawing, generally each anode 25 has a cathode cell on each side thereof. The anode, is also connected to the power source and thus serves as a positive pole. Upon the application of a direct current power source, an electric field is established in the EAVF system. The phenomena of electrophoresis typically causes the vinyl resin particles to generally but not always necessarily move toward the anode and away from the cathode because of the negative charge of the dispersed particles, such as a vinyl resin, due to the surfactant, emulsifier, etc., thereon. Since the dispersed particles move away from the cathode, effective filtration of water through filter cloth 17 is achieved. Various water soluble compounds, such as salts, surfactants, emulsifiers, are partially removed. Naturally, the dispersion resin particles are deposited on anode 25 and form a cake. Since electrophoresis causes all sizes of particles to move at the same rate, a cake is produced of the same particles size distribution as in the slurry. Since the dispersed particles tend to be corrosive and degrade metal anode 25, an inert but porous lattice or framework 28 is located around said anode. Filter cloth 27 made of cotton, polyester, polypropylene, etc., is located on the lattice. The anode 25, lattice 28, and cloth 27 thus form an anode cell. Desirably, the anode filter cloth is coated with a conventional membrane which has low water permability. The membrane can be either chemically and electrically neutral or it can act as an ion exchange medium for the purpose of either increasing or impeding the flow of ions. Examples of such membranes include Dynel (a trademark of Union Carbide Company, a copolymer of vinyl chloride and acrylonitrile); and Nafion (a trademark of E. I. DuPont de Nemours Company, a perfluorosulfonic acid membrane), or membranes made of polypropylene.

The anode cell desirably is filled with a circulating electrolytic solution called an anolyte. According to the present invention, the anolyte contains an electrolyte or combination of electrolytes in a solvent (e.g., water) which when utilized in the electrically augmented vacuum filter will partially replace at least some and usually most if not all of the replaceable ions on the dispersed particles, and/or react with the ions (surfactants, salts, etc.) on the particles thereby altering or changing the surface ion environment of said dispersed particles. At least some of the anode electrolyte will also be added in whole to the particle surface.

Once a current is applied, an electron flow is established between the anode and the cathode through the filtrate, the dispersed particle slurry, the wetcake, anode membrane 27 and anolyte 28. Charge flow is accomplished by the movement of ions from electrode to electrode, for example anolyte ions moving toward the cathode. In order to establish an efficient current flow, it is important that the anolyte have a conductivity of at least 5,000 micromhos/cm, and more desirably at least 30,000 micromhos/cm. During the process of the present invention, high conductivity of the anolyte is maintained. In addition to protecting the anode, the anolyte can be recirculated via pump 35 and cooled to remove heat generated during the process before being recycled to the anode filter cell.

Considering the catholyte within the cathode vacuum filter or cell, it usually contains a hydroxide electrolyte. The conductivity of the catholyte is not critical and can vary as from as low as 600 micromhos/cm or more desirably from 2,000 micromhos/cm and higher.

The above description is a brief explanation of the operation of the EAVF. With regard to further details of such a filter, reference is hereby made to U.S. Pat. No. 4,207,158 which is hereby fully incorporated by reference with regard to its teaching, instruction, operation, and preparation of such a filter. It is furthermore noted that according to the present invention, generally any electrofilter known to the art as well as to the literature can be utilized as long as it contains an anolyte in an anode cell.

As noted above, during the preparation of the various dispersed particles, inasmuch as various surfactants, emulsifiers, and the like are utilized, the resins or the end products thereof have various drawbacks such as cloudy film, poor color, low gloss, excessive viscosity and the like. According to the present invention, it has been found that such drawbacks and properties can be altered or changed by changing the surface characteristics of the dispersed particles.

Generally, as noted above, the anolyte contains ions and compounds which will replace and/or add to and/or react with the surfactant, soap, salt, etc., ions present on the polymerized resin particle. That is, most of the original ions are replaced while some of the other original ions may be reacted with the anolyte ions and/or compounds. Additionally, some of the anode compound (electrolyte) will be added in whole to the particle surface. The net result is that the surface characteristics of the particle and ultimately the properties of intermediate and final products produced from the particles are altered. The replacement of ions or altering of the original ion environment is usually large, as from about at least 50%, desirably 80% or 90%, and often 95% or 99%+ of the total number of ions. The extent of partial replacement, reaction, or addition, is that necessary to cause a desired property change in either the particle or end product made therefrom. The amount of replacement, reaction and/or addition is dependent on and can be controlled by such factors as valence state, a vacuum in the anode cell of from about 0 to about 30 inches of Hg, molecular weight of anolyte compositions, concentration of the anolyte, permeability of the membrane, and ions present on the resin. The concentration of the electrolyte in the anolyte can be varied depending upon the solubility thereof, the temperature of the anolyte, the viscosity of the anolyte solution, and the like. Desirably, the concentration is an effective amount, that is such that a minimum conductivity of at least 5,000 micromhos/cm and a solution viscosity generally below 150 centipose is achieved.

In order to more fully explain the present invention, a specific embodiment is hereby set forth. That is, in an EAVF as shown in the drawing, a polyvinyl chloride resin is added which has been prepared by emulsion polymerization wherein the emulsifier was sodium lauryl sulfate. The anolyte used was a cadmium nitrate solution. Atomic absorption spectroscopy was used to analyze the amount of cadmium and sodium metal ions present on the resin before electrofiltering and the amount present on the resin after it had been deposited as a cake at the anode and then removed from the electrofilter. Before electrofiltering, the resin contained 850 ppm of sodium, presumably as the counter ion in the surfactant sodium lauryl sulfate. After electrofiltering the resin contained only 139 ppm of sodium, 16% of the original level. The resin also contained 2417 ppm of cadmium, presumably now the new counter ion of 84% of the lauryl sulfate surfactant anions. This change is effected by the cadmium ion in the anolyte flowing through the anode cloth 27 and engaging a surfactant covered polyvinyl chloride particle in the wetcake. Additionally about 10% by weight of anolyte solution was lost from the anode cavity/anolyte system on this experiment and similarly on essentially all electrofiltering experiments. The cause being primarily the electro-osmotic force on the anolyte solution to move it from the anode cavity, through the anode membrane, and into the resin cake. This lost anolyte is accounted for in the above example by the excess of cadmium present above the stoichiometric balance of ions exchanged when the valence state of +2 for cadmium is taken into consideration. Thus, ions are replaced and the anode electrolyte is added to the resin cake.

The present invention is applicable to many situations wherein it is desirable to change the surface characteristics of the various dispersion resins. That is, whenever it is desirable to exchange some and usually most if not all of the original ions (e.g. emulsifiers) on the dispersed particle, or add an incremental amount of an electrolyte or other compound (e.g., new emulsifier) onto the dispersion resin, the electrofiltration process can be utilized. The ion exchange compound, that is the electrolyte which is conveniently contained in the anolyte, frequently is a different ion than the original dispersion resin ion and accordingly is exchanged therewith. Alternatively, or in addition to the anolyte, the anode membrane and/or any conventional membrane coating can effect exchange with the disperson resin ion. Thus, once an electric field is applied to the electrofilter, ion exchange can take place from any of the above noted sources with the disperson resin and accordingly alter the surface ion characteristics thereof. Generally, the various dispersion resins noted hereinabove, and especially the vinyl resins can have the characteristics of the surface modified such that the resin or resulting products may have properties modified such as clarity, color, gloss, heat stability, foamability, viscosity aging, and usually most importantly, viscosity.

It is desirable to modify the viscosity of plastisols made from the various dispersed particles such as the vinyl resins by either increasing their viscosity to a maximum level or by decreasing the viscosity to a specific level. The type and amount of plasticizer will generally affect the viscosity. However, as a general overall statement the viscosity of such plastisols wherein a high viscosity is desired is at least 50,000, as from about 50,000 to about 500,000 centipoise. On the other hand, in situations where it is desired to have an intermediate viscosity, the viscosity can be from about 15,000 centipoise to about 50,000 centipoise. A low viscosity is from about 1 to about 15,000 centipoise. To obtain a desired viscosity level or other property change with regard to specific type and amount of plasticizer, the exact degree of ion replacement can be readily determined with regard to a particular dispersion resin having a particular ion thereon by various trial and error techniques. That is, in view of the large number of variables such as type of plasticizer, amount of plasticizer, the particular resin particle, the particular type of ion thereon, and the like, generalizations with regard to the amount or type of analoyte do not always apply. However, the necessary amount or type to effect a desired property change given a particular plasticizer, resin, etc., can be readily determined in accordance with the concepts of the present invention.

In the field of vinyl plastisols, it is often desirable that the plastisol have a high viscosity under no shear but a low viscosity under slight or partial shear, commonly referred to as being pseudoplastic or exhibiting yield. That is, the plastisol can be made to flow under slight or partial shear but upon the removal of shear, immediately ceases flowing and remains in place. Such a property can be measured by a $V_2/V_{20}$ ratio, Brookfield RVF Viscometer readings taken at 2 rpm ($V_2$) and 20 rpm ($V_{20}$), wherein high ratios as generally above 2, more desirably above 3, and preferably above 4.5 are favored. Some of the anode electrolytes which usually exhibit such properties in association with vinyl resins include the following: alpha olefin sulfonate, sodium lauryl sulfate, polyacrylic acid, sodium acetate, sodium borate, and sodium isodecyl sulfate.

The above list of viscosity modifying anode electrolytes has been given with regard to the vinyl resin particle containing a common emulsifier thereon such as sodium lauryl sulfate, sodium alkyl substituted aryl sulfate, and sodium tridecyl ether sulfate. Should different emulsifiers be utilized, the amount of ion replacement, extent of reaction, or substitution on the whole particle as well as the type of ion or anode electrolyte may have to be varied to yield a desirable viscosity change but such can be readily ascertained.

In order to more fully understand and describe the present invention, the following table sets forth a list of various anode electrolytes which have been found to modify viscosity, that is to yield a low, medium or high viscosity vinyl plastisol. Although the exact phenomenon is not fully known and while not being bound by theory, it is postulated that the viscosity may vary in accordance with the hydrodynamic radius of the modified dispersed particles. That is, generally if the hydrodynamic radius is large, the treated particles will have a high viscosity whereas if the hydrodynamic radius is small, generally the viscosity will be lower. Of course, other factors can and will influence the viscosity change as well as cause various property changes with the above being only a hypothesis.

Accordingly, vinyl dispersed particles having various different primary surfactants thereon when used in an electrofilter containing the electrolyte set forth below as part of the anolyte solution produced vinyl resins generally exhibiting plastisol viscosities as indicated The plastisols typically contained a common plasticizer, that is, di-2-ethyl hexyl phthalate (also called dioctyl phthalate, DOP).

TABLE 1

| Plastisol Viscosity - Brookfield RVF, 2 rpm, 1 Day Age, Centipoise | | |
|---|---|---|
| 0–15,000 cp | 15,000–50,000 cp | 50,000–5000,000 cp |
| Sodium 2-ethyl hexyl sulfate | Sodium sulfate alkylphenoxy polyethanol | Sodium alpha olefin sulfonate |
| Sodium tridecyl sulfate | Sodium tridecylether sulfate | Sodium lauryl sulfate |
| Sodium alkyl phenol polyether sulfate | Sodium dodecyl benzene sulfonate | Polyacrylic acid |
| Ammonium carbonate | Sodium laurate | Sodium acetate |
| Sodium triethanolamine lauryl sulfate | Sodium lauryl ether sulfate | Sodium silicate |
| Secondary sodium alkane sulfonate | Sodium methyl sulfate | Sodium benzoate |
| Sodium octyl sulfate | | Sodium borate |
| Magnesium lauryl sulfate | | |

The modification of the surface characteristics or the change in surface ion enivronment is generally applicable with regard to various types of viscosity of the dispersed particles including pseudoplastic, dilatant, newtonian viscosities and the like. That changing the particular compound utilized as the electrolyte in the anolyte would change the various properties of the various dispersed particles was unexpected since it was previously unknown to be possible to significantly modify the properties of the dispersed particles or resins after polymerization without extensive solvent extraction of the soap and subsequent re-emulsifying with a different soap. Such a process moreover is very costly.

The anode electrolyte compounds are soluble in a solvent, usually water, and are organic or inorganic salts. Considering the organic salts, the cation portion is generally an alkali or an alkali earth such as lithium, sodium, magnesium, potassium, calcium, and the like. Additionally, various transitional metals can be utilized such as cadmium, zinc, copper, and the like. The anion portion of the organic salt is generally an organic ester such as an organic sulfate, sulfonate nitrate, phosphate, and the like having from about 2 to about 20 carbon atoms, desirably from about 10 to about 18 carbon atoms. The organic derivatives of the anions can also be polyethers containing up to 30 carbon atoms. The aliphatic derivative can be alkyl or alkenyl. Often the organic anode electrolyte is a surfactant such as a detergent or emulsifier. Examples of such suitable surfactants are set forth in the various annual editions of *McCutcheon's Detergents and Emulsifiers*, North American Edition, International Edition, Functional Materials, 1979, as well as preceding and subsequent years, which text is hereby fully incorporated by reference.

Considering the inorganic electrolytes, the cation portion is also generally an alkali or alkali earth such as sodium, potassium, calcium, magnesium, and the like. Other cations can also be utilized such as ammonium, quaternary amines, and the like. The anionic portion is usually a complex such as a carbonate, a nitrate, a borate, a sulfate, a sulfonate, phosphate, polyphosphate, silicates, aluminates, and the like. Specific examples of such anode electrolytes have been set forth above in Table 1 wih regard to their viscosity-modifying properties of vinyl plastisols. Naturally, many other electrolytes can be utilized in accordance with the present invention and their property modifying effects readily determined.

An unexpected and important aspect of the present invention is that very small amounts of an anode electrolyte when added whole, to the particle surface, are required to modify properties of the dispersed particles. For example, effective modification of various dispersed particles or resins are obtained by utilizing a maximum of about one-half part by weight of anode electrolyte which is added whole per 100 parts by weight of dispersed particles. More specifically, improvements with regard to dispersed particle properties have been obtained by utilizing from about 0.01 to about 0.5 or 1.5 parts by weight per 100 parts by weight of the dispersed particle or resin, desirably from about 0.05 to about 0.3 parts by weight and preferably from about 0.05 to about 0.1 part by weight. Such a result is clearly unexpected since to obtain the same effect in a spray dryer, massive amounts were required, that is, at least 1.5 parts by weight but most often substantially greater amounts.

Although only an electrofilter, that is the electrically augmented vacuum filter, has been described herewith in detail, it is to be understood that other apparatus can be utilized in association with apparatus resulting in a low energy dewatering of the dispersed particles or resins such as polyvinyl chloride. For example, an optional conventional prefilter can be utilized to remove a portion of the water from the dispersed particle slurry and increase the amount of total solids of the slurry which is then fed to the electrofilter. After replacing ions on the particles, reaction therewith or the like, the cake from the electrofilter which generally contains from about 65% to about 95% and more desirably from about 80% to about 85% by weight of total solids therein is fed to a final dryer such as a mechanical dryer known to the art and to the literature. Examples of such mechanical dryers include a rotary dryer, a Venturi dryer, a fluidized bed dryer, a conveyor dryer and the like. However, a preferred final dryer is a fluid energy dryer wherein heated air or gas is injected generally under highly turbulent conditions. The apparatus, as well as the process is fully described in a patent application simultaneously filed herewith for "Low Energy Dewatering of Dispersed Particle Latexes by Electrofiltration", and is hereby fully incorporated by reference. Once the dispersed particles have been dried, they can be utilized in a conventional manner heretofore known. For example, dried vinyl particles can be utilized in plastisols for various film applications and the like.

The dispersed particles or resins made according to the present invention can be used in the same areas as heretofore existed. For example, the vinyl resins can be utilized in plastisols for manufacturing vinyl flooring, coated fabric, unsupported fabric, vinyl foam sheet, molded parts such as balls, toys, automotive parts, etc. When low viscosity plastisols are made according to the present invention, they can be utilized in various areas such as coated fabrics as well as vinyl roll flooring. The high viscosity vinyl resin plastisols can be used as sealants as in the automotive industry, as for example attaching fenders to the body, and the like.

In forming the plastisols, a liquid plasticizer is added to the dispersion resin whereby the particles, for example the solid vinyl resin particles are suspended. The types of plasticizers are well known to the art as well as to the literature. Examples of suitable plasticizers include the various phthalates, the various epoxies, the various aliphatic diesters, the various phosphates, the various polyesters, the various specialty plasticizers, and combinations of the above. Additionally, various extenders can also be added. Of the various plasticizers, the phthalate diesters are preferred such as the isomers of dioctyl phthalate. With regard to specific plasticizers, reference is hereby made to *Plastisols and Organosols*, Chapter 3, "Plasticizers", by Miller and Wickson, edited by Sarvetnick, Van Nostrand Reinhold Co., 1972, which is hereby full incorporated by reference with regard to the various types, classes, individual plasticizers and the like.

The amount of plasticizer can generally vary over a wide range depending upon the use of various fillers and other compounding ingredients well known to the art and to the literature. The amount of plasticizer is generally from about 25 to about 300 parts and desirably from about 45 to 100 parts by weight based upon 100 parts by dry vinyl resin particles. Generally, the plastisol has an average particle size of from about 0.1 to about 20 microns, desirably from about 0.5 to about 2.5 microns, and preferably from about 0.8 to about 1.2 microns.

The invention will be better understood by reference to the following examples.

EXAMPLE 1

GEON® 121 slurry, a medium molecular weight polyvinyl chloride having a medium level of an alpha-olefin sulfonate salt, after stripping and concentrated to a 48% total solids content was fed to a electrofilter unit (EAVF) to maintain a constant level. The electrofilter was a Millileaf model manufactured by Door Oliver, having a cathode cell and an anode cell with an anode membrane thereon. The slurry was then subjected to an electric field of direct current at 13.33 $MA/cm^2$ such that a wetcake was deposited on the anode membrane. Periodically the cake was removed and the total solids content was measured and found to be consistently in the 79–80% range. The wetcakes were dried in a fluid energy dryer-grinder, Thermajet, manufactured by AlJet Equipment Co., Willow Grove, Pa., to yield a finely divided dry powder. Plastisols were prepared from the dry resin in a standard screening formulation:

|  | Parts by Weight |
|---|---|
| PVC | 100 |
| DOP | 57 |
| Epoxidized Soybean oil | 3 |
| SYNPRON 940 (a stabilizer) | 2 |

Viscosity of the plastisol was determined at 25° C. using a Brookfield RVF Viscometer at spindle speeds of 2 and 20 rpm.

Conditions were maintained constant throughout the series of tests with the only change being in the type of anolytic compound circulated through the anode cell. The conductivity of the anolyte was maintained at 20,000–50,000 micromhos/cm. After sufficient cake was generated for a dryer run, the electrofiltration was stopped and anolyte was drained from the membrane cavity, the cavity was rinsed and a new anolyte solutio was charged. All anolyte solutions utilized water as the solvent and the anode electrolyte concentration was adjusted to maintain conductivity in the proper range. The results obtained are set forth in Table 2.

TABLE 2

| RUN #1 | ANOLYTE | BROOKFIELD VISCOSITY (CENTIPOISE) | | YIELD |
|---|---|---|---|---|
| | | $V_2$ | $V_{20}$ | |
| 1 | 0.5 M Ammonium Carbonate | 9,500 | 5,000 | 1.9 |
| 2 | 0.5 m Sodium Acetate | 215,000 | 31,500 | 6.8 |
| 3 | 0.5 m Sodium Formate | 35,000 | 13,500 | 2.6 |
| 4 | 0.5 m Sodium Borate | 150,000 | 23,500 | 6.4 |
| 5 | 0.5 m Cadmium Nitrate | 6,500 | 4,300 | 1.5 |
| 6 | *10% Sodium Lauryl Sulfate | 62,000 | 16,000 | 3.9 |
| 7 | *10% Sodium 2-Ethyl-Hexyl Sulfate | 5,500 | 3,100 | 1.8 |
| 8 | *10% Sodium octyl Sulfate | 11,000 | 6,200 | 1.8 |
| 9 | *10% Sodium Isodecyl Sulfate | 55,000 | 15,000 | 3.7 |
| 10 | *10% Magnesium Lauryl Sulfate | 11,500 | 6,600 | 1.7 |
| 11 | *10% Sodium Tridecyl Sulfate | 17,000 | 8,300 | 2.0 |
| 12 | *10% Triethanolamine Lauryl Sulfate | 8,200 | 4,300 | 1.9 |
| 13 | *.06 m Sodium Methyl Sulfate | 18,000 | 8,200 | 2.2 |
| 14 | *10% Sodium Tridecylether Sulfate | 22,000 | 9,800 | 2.2 |
| 15 | *10% Sodium Alpha Olefin Sulfonate | 55,000 | 15,300 | 3.6 |
| 16 | *10% Sodium Alkyl Aryl Polyether Sulfate | 6,000 | 4,000 | 1.5 |
| 17 | *10% Secondary Sodium Alkane Sulfonate | 9,000 | 5,400 | 1.7 |
| 18 | *10% Sodium Dodecylbenzene Sulfonate | 25,000 | 12,500 | 2.0 |

*Adjusted with 0.5 m ammonium carbonate to the proper conductivity range.

EXAMPLE 2

A dispersed polyvinyl chloride resin was polymerized using a typical sodium alpha olefin sulfonate as the primary surfactant. A 43% solids feed of the polymer was processed in a lab electrofilter as set forth in Example 1. The current density was 13.33 milliamps/cm$^2$. The vacuum of the cathode was 20 inches of mercury. A 78% solids cake was produced. The anolyte consisted of a 10% solids solution of this same sodium alpha olefin sulfonate surfactant, in combination with an ammonium carbonate buffer. The slurry conductivity was 1,000 micromhos per cm and the anolyte conductivity was 13,000 micromhos/cm. Cake was formed at a rate of 21.2 lbs/hr.

The product was dried in a fluid energy dryer as set forth in Example 1 with 5.7 PSIG inlet air at 100° C. Outlet air temperature was controlled at 49° C. The dry resin was tested and found to contain 0.08% water and 2.8% of materials extractable by methanol. Plastisol properties when prepared according to the formulation of Example 1 included one day Brookfield viscosity of 56,000 centipoise at 2 rpm and 18,400 centipoise at 20 rpm. Severs efflux was 16.1 grams per 100 sec., and particle size was 30 microns by vinyl dispersion gauge. Fused vinyl films exhibited good gloss and clariy at 82% reflectance and 76% transmitance. Heat stability at 375° F. was also good with 19 minutes to initial color deveopment and 28 minutes until severe darkening.

When this product was spray dried representing conventional processing, it contained 2.6% methanol extractable material and 0.1% moisture. Plastisol Brookfield viscosities prepared in accordance with the formulation of Example 1 was 14,000 centipoise at 2 rpm and 9,400 centipoise at 20 rpm. Severs efflux was 17.7 grams/100 sec. and the vinyl dispersion gauge was 40 micron particles. Film properties of 84% gloss, 76% clarity, and 21 minutes to first color at 375° F. were obtained.

The same dispersion polyvinyl chloride slurry as above was processed on the electrofilter as set forth in Example 1 with 13.33 milliamp per cm$^2$ and 20 inches of mercury vacuum. In this experiment the anolyte chosen was a 10% solids solution of sodium 2-ethyl hexyl sulfate with ammonium carbonate as buffer. Cake was produced at 24.4 lbs./hr. with a solids content of 78%. Anolyte conductivity was measured as 38,500 micromhos/cm.

The cake was dried in the fluid energy dryer at 6.0 PSIG and 100° C. inlet air. Outlet temperature was 49° C. Properties of the final product were similar to the prior cases with 0.07% moisture and 2.4% extractables. Plastisol viscosity prepared in accordance to the formulation of Example 1 was very low, with 7,000 centipoise at 2 rpm and 4,600 centipoise at 20 rpm. Severs efflux was 16.7 grams/100 sec. and vinyl dispersion gauge was 20 microns.

From these examples it can be seen that both very high and very low Brookfield viscosities are produced from the same dispersion polyvinyl chloride slurry by simply changing the anolyte used in the electrofilter. These examples also show that several mechanisms effect these property changes including ion exchange on the resin and addition of materials to the resin which via various means interact with the materials already present on the resin particles to change the surface characteristics. These interactions are strongly influenced by the electrical field present in the electrofilter, as evidenced by the experiment wherein the anolyte and primary surfactant are the same material yet the final properties are significantly changed from spray dried product.

According to the present invention, it is possible for one skilled in the art to modify the various final properties of dispersed resin materials. In the case of vinyl dispersed resins, depending on the materials known to be present on the resin, e.g., surfactants, soaps, salts, etc., and the desired property or properties to be modified in the plastisol or finished product application, one can readily choose an anolyte compound yielding said desired results. Examples of materials yielding desired results are listed in Table 1. Further examples of specific results are set forth in the following tables.

TABLE 3

| Desired Property | High plastisol viscosity (1 day, 2 rpm Brookfield greater than 25,000 cp) |
|---|---|
| Primary Surfactant on Resin | Sodium lauryl sulfate |
| Plastisol Ingredients | |
| Primary Plasticizer | Dioctyl phthalate |
| Anolytes* | Sodium alpha olefin sulfonate |
| | Sodium lauryl sulfate |

TABLE 3-continued

Sodium 2-ethyl hexyl sulfate
Lithium sulfate

*Note that ammonium carbonate is used as a buffer with most anolytes and to control conductivity.

TABLE 4

| Desired Property | Low plastisol viscosity (1 day, 2 rpm Brookfield less than 25,000 cp) |
|---|---|
| Primary Surfactant on Resin | Sodium lauryl sulfate |
| Plastisol Ingredients | |
| Primary Plasticizer | Dioctyl phthalate |
| Anolytes* | Sodium alkyl aryl polyether sulfate |
| | Sodium alky polyether sulfate |
| | Sodium tridecyl sulfate |
| | Ammonium carbonate |

*Note that ammonium carbonate is used as a buffer in most of the anolyte systems.

TABLE 5

| Desired Property | Low plastisol viscosity (1 day, 2 rpm Brookfield less than 25,000 cp) |
|---|---|
| Primary Surfactant on Resin | Sodium alpha olefin sulfonate |
| Plastisol Ingredients | |
| Primary Plasticizer | Dioctyl phthalate |
| Anolytes* | Sodium 2-ethyl-hexyl sulfate |
| | Ammonium carbonate |
| | Sodium tridecyl sulfate |
| | Sodium alkyl aryl polyether sulfate |
| | Sodium alkyl aryl sulfate |
| | Secondary sodium alkane sulfonate |
| | Cadmium nitrate |
| | Sodium methyl sulfate |
| | Ammonium nitrate |

*Note: Ammonium carbonate is used as buffer in most anolyte systems.

TABLE 6

| Desired Property | High plastisol viscosity (1 day, 2 rpm Brookfield over 25,000 cp) |
|---|---|
| Primary Surfactant on Resin | Sodium alpha olefin sulfonate |
| Plastisol Ingredients | |
| Primary Plasticizer Anolytes* | Dioctyl phthalate |
| Sodium bicarbonate | Sodium hydroxide |
| Lithium sulfate | Sodium benzoate |
| Barium nitrate | Sodium silicate |
| Potassium hypophosphate | Sodium citrate |
| Sodium metabisulfate | Sodium tridecyl ether sulfate |
| Sodium nitrate | |
| Sodium hypophosphate | Sodium lauryl ether sulfate |
| Potassium carbonate | Sodium laurate |
| Sodium formate | Polyacrylic acid |

*Note: Ammonium carbonate is used as buffer in most anolyte systems.

TABLE 7

| Desired Property | Super high viscosity plastisol (1 day, 2 rpm Brookfield, over 150,000 cp) |
|---|---|
| Primary Surfactant on Resin | Sodium alpha olefin sulfonate |
| Plastisol Ingredients | |
| Primary Plasticizer Anolytes* | Dioctyl phthalate |
| Ammonium sulfate | Sodium borate |
| Zinc sulfate | Sodium propionate |
| Sodium acetate | |

*Note: Ammonium carbonate is used as a buffer in most anolyte systems.

TABLE 8

| Desired Property | Low viscosity plastisol (1 day, 2 rpm Brookfield less than 25,000 cp) |
|---|---|
| Primary Surfactant on Resin | Ammonium laurate |
| Plastisol Ingredients | |
| Primary Plasticizer | Dioctyl phthalate |
| Anolytes* | Secondary sodium alkane sulfonate |
| | Ammonium carbonate |
| | Sodium alpha olefin sulfonate/sodium 2-ethyl hexyl sulfate |
| | Sodium 2-ethyl hexyl sulfate |
| | Sodium tridecyl sulfate |
| | Sodium alkyl phenol polyether sulfate |
| | Sodium lauryl ether sulfate |

*Note: Ammonium carbonate is used as buffer in most anolyte systems.

TABLE 9

| Desired Property | High viscosity plastisol (1 day, 2 rpm Brookfield over 25,000 cp) |
|---|---|
| Primary Surfactant on Resin | Ammonium laurate |
| Plastisol Ingredients | |
| Primary Plasticizer | Dioctyl phthalate |
| Anolytes* | Sodium alpha olefin sulfonate |
| | Cadmium nitrate |
| | Sodium acetate |

*Note: Ammonium carbonate is used as a buffer in most anolyte systems.

TABLE 10

| Desired Property | Ultra low viscosity plastisol (1 day, 2 rpm Brookfield under 10,000 cp) |
|---|---|
| Primary Surfactant on Resin | Sodium alkyl substituted aryl polyether sulfate |
| Plastisol Ingredients | |
| Primary Plasticizer | Dioctyl phthalate |
| Anolytes* | Sodium alpha olefin sulfonate |
| | Sodium tridecyl sulfate |
| | Sodium 2-ethyl hexyl sulfate |

*Note: Ammonium carbonate is used as buffer in most anolyte systems.

TABLE 11

| Desired Property | Low plastisol viscosity (1 day, 2 rpm Brookfield under 15,000 cp) |
|---|---|
| Primary Surfactant on Resin | Sodium alpha olefin sulfonate |
| Plastisol Ingredients | |
| Primary plasticizer | Dioctyl phthalate/butyl benzyl phthalate |
| | Azodicarbonamide |
| Anolytes* | Ammonium carbonate |
| | Sodium alkyl aryl polyether sulfate |
| | Sodium 2-ethyl hexyl sulfate |

*Note: Ammonium carbonate is used as buffer in most anolyte systems.

TABLE 12

| Desired Property | High plastisol viscosity (1 day, 2 rpm Brookfield over 15,000 cp) |
|---|---|
| Primary Surfactant on Resin | Sodium alpha olefin sulfonate |
| Plastisol Ingredients | |
| Primary Plasticizer | Dioctyl phthalate/butyl benzyl phthalate |
| | Azodicarbonamide |
| Anolytes* | Sodium acetate |
| | Sodium sulfate |

TABLE 12-continued

Sodium alpha olefin sulfonate

*Note: Ammonium carbonate is used as buffer in most anolyte systems.

TABLE 13

| Desired Property | High film clarity (greater than 70%) |
|---|---|
| Primary Surfactant on Resin | Sodium alpha olefin sulfonate |
| Plastisol Ingredients | |
| Primary Plasticizer | Dioctyl phthalate |
| Anolytes* | Sodium alpha olefin sulfonate |
| | Sodium lauryl sulfate |
| | Ammonium carbonate |
| | Sodium sulfate |
| | Polyacrylic acid |
| | Sodium alkyl aryl polyether sulfate |
| | Potassium sulfate |

*Note: Ammonium carbonate is used as buffer in most anolyte systems.

While in accordance with the patent statutes, a preferred embodiment and best mode has been set forth, the scope of the invention is not limited thereto, but rather by the scope of the attached claims.

What is claimed is:

1. Dispersed particles having replaceable ions thereon forming a surface ion environment formed by the steps comprising:
    adding the dispersed particles to an electrically augmented vacuum filter having an anode cell, adding an effective amount of an anolyte compound to said anode cell so that said anode cell has a conductivity of at least 5,000 micromhos/cm, applying a current of said anode cell, and altering the surface environment of said dispersed particles by at least partially replacing ions of said dispersed particles with said anolyte compound.

2. Dispersed particles according to claim 1, and wherein said anode cell has an optional membrane thereon.

3. Dispersed particles according to claim 2, wherein said dispersed particles are a vinyl resin, and wherein said anolyte is an electrolyte.

4. Dispersed particles according to claim 3, wherein said electrically augmented vacuum filter has a cathode cell therein.

5. Dispersed particles according to claim 4, wherein said anode cell has a conductivity of at least 30,000 micromhos/cm, wherein said vinyl resin migrates to said anode, wherein the amount of anolyte added to said particle surface is from about 0.01 to about 1.5 parts by weight per 100 parts by weight of said particles, and wherein said anolyte is ammonium carbonate, sodium 2-ethyl hexyl sulfate, or sodium alkyl phenol polyether sulfate.

6. Dispersed particles according to claim 5, wherein at least 80% of said replaceable ions are displaced.

7. Dispersed particles according to claim 6, wherein said vinyl resin is polyvinyl chloride.

8. A process for changing the surface characteristics of a dispersed particle in an electrically augmented vacuum filter having an anode cell and containing a dispersed particle slurry therein; comprising the steps of:
    utilizing an anolyte solution having ions therein in the anode cell, wherein said anolyte is an organic salt or an inorganic salt, wherein the cation portion of said inorganic salt is an alkali, an alkaline earth, ammonium, or a quarternary amine and wherein the anionic portion is a carbonate, a nitrite, a borate, a sulfate, a sulfonate, a phosphate, a polyphosphate, a silicate, or an aluminate,
    collecting the dispersed particles on said anode cell, said dispersed particles having ions thereon,
    exchanging at least an effective amount of said dispersed particle ions for said anolyte ions, and
    further altering the surface environment of said dispersed particles by adding some of said anolyte compound in whole to the surface of said particles.

9. A process according to claim 8, wherein said anode cell has a conductivity of at least 5,000 micromhos/cm.

10. A process according to claim 9, wherein said anolyte compound is a viscosity modifying compound, and wherein at least 50% of said dispersed particle ions are replaced by said anolyte ions.

11. A process according to claim 10, wherein said dispersed particles are a vinyl resin, including adding a plasticizer to said vinyl resin to form a plastisol, and wherein said viscosity modifying compound increases the viscosity of said plastisol to at least 15,000 centipoise.

12. A process according to claim 11, wherein the conductivity of said anode cell is at least 30,000 micromhos/cm, and wherein the viscosity of said plastisol is at least 50,000 centipoises.

13. A process according to claim 10, wherein said dispersed particles are a vinyl resin, including adding a plasticizer to said vinyl resin to form a plastisol and wherein said viscosity modifying compound decreases the viscosity of said plastisol to 15,000 centipoise or less.

14. A process according to claim 13, wherein the conductivity of said anode cell is at least 30,000 micromhos/cm and wherein said anolyte is ammonium carbonate, sodium alkyl phenol polyether sulfate, or sodium 2-ethyl hexyl sulfate.

15. A process according to claim 14, wherein said vinyl resin is polyvinyl chloride.

16. Particles prepared by dispersion polymerization, comprising:
    the dispersed particles, said dispersed particles having replaceable dispersion preparation ions thereon, said dispersed particles having at least an ion thereon added thereto other than the dispersed preparation ion in the presence of an electrically augmented vacuum filter, and wherein the amount of said ion added thereto is at least 50% of the total number of replaceable dispersion preparation ions.

17. Polymerized dispersed particles according to claim 16, wherein said dispersed particles are a vinyl resin, and wherein the amount of said ion other than said dispersed preparation ion is at least 80% of said replaceable dispersion preparation ions.

18. Polymerized dispersed particles having a modified surface characteristic, comprising:
    the dispersed particles, said dispersed particles having the modified surface characteristic imparted thereto by having at least a modifying ion thereon other than the dispersed preparation ion, said modifying ion impartable thereto from an anode electrolyte in the presence of an electrically augmented vacuum filter, the amount of said anode electrolyte added to the surface of said particles being from about 0.01 to about 1.5 parts by weight per 100 parts by weight of said dispersed particles.

19. Dispersed particles according to claim 18 wherein said modifying ion impartable to said particles is conductable in an anode solution having the conductivity of at least 5,000 micromhos/cm.

20. Dispersed particles according to claim 19 wherein said dispersed particles are a vinyl resin, and wherein said anode electrolyte is an organic salt or an inorganic salt, wherein the cation portion of said organic salt is a metal and wherein the anion portion of said organic salt is a metal and wherein the anion portion of said organic salt is an organic ester of a sulfate, a sulfonate, a nitrate, or a phosphate and wherein said organic portion is alkyl or an alkenyl having from 2 to about 20 carbon atoms, wherein the cation portion of said inorganic salt is an alkali, an alkaline earth, ammonium, or a quaternary amine, and wherein the anion portion is a carbonate, a nitrite, a borate, a sulfate, a sulfonate, a phosphate, a polyphosphate, a silicate, or an aluminate.

21. Dispersed particles according to claim 20, wherein the amount of said anode electolyte added to said particle surface is from about 0.05 to about 0.3 parts by weight per 100 parts by weight of said particles, wherein said conductivity of said anolyte is at least 30,000 micromhos/cm, wherein said anolyte is ammonium carbonate, solium alkyl phenol polyether sulfate, or sodium 2-ethyl hexyl sulfate; and wherein some of said anode electrolyte is added in whole to the surface of said particles.

22. Dispersed particles according to claim 21, wherein said modified surface characteristic is the viscosity of said particle.

23. Dispersed particles according to claim 21, wherein the amount of said anode electrolyte added to said particle surface is from about 0.05 to about 0.1 parts by weight per 100 parts by weight of said particles.

* * * * *